US012487100B2

(12) United States Patent
Woo et al.

(10) Patent No.: US 12,487,100 B2
(45) Date of Patent: Dec. 2, 2025

(54) ROBUST ODOMETRY ARCHITECTURE AND METHODOLOGY

(71) Applicant: GM GLOBAL TECHNOLOGY OPERATIONS LLC, Detroit, MI (US)

(72) Inventors: Ami Woo, Calgary (CA); Khizar A. Qureshi, Pickering (CA); Matan Yeger, Pardes Hanna-Karkur (IL); Hassan Askari, Thornhill (CA); Mohammadali Shahriari, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/668,465

(22) Filed: May 20, 2024

(65) Prior Publication Data

US 2025/0354830 A1    Nov. 20, 2025

(51) Int. Cl.
*G01C 22/00* (2006.01)
(52) U.S. Cl.
CPC .................................. *G01C 22/00* (2013.01)
(58) Field of Classification Search
CPC ....................................................... G01C 22/00
See application file for complete search history.

(56) References Cited

U.S. PATENT DOCUMENTS

| 2019/0163189 A1* | 5/2019 | Jensen ............... G05D 1/0272 |
| 2021/0325544 A1 | 10/2021 | Bageshwar |
| 2023/0053629 A1 | 2/2023 | Iken et al. |
| 2023/0062898 A1 | 3/2023 | Bageshwar |

FOREIGN PATENT DOCUMENTS

DE    102014211180 A1    12/2015

* cited by examiner

*Primary Examiner* — Matthew Mikels
(74) *Attorney, Agent, or Firm* — Quinn IP Law

(57) ABSTRACT

A vehicle includes a plurality of sensors and one or more controllers collectively programmed to execute the following instructions: estimate odometry of the vehicle based on sensor data from the plurality of sensors, to produce a plurality of odometry estimates; monitor integrity of one or more of the sensors; correct sensor data from one or more of the plurality of sensors to provide corrected sensor data; compensate the corrected sensor data to provide compensated data; and use the compensated data to provide at least one of vehicle odometry, vehicle states, and time stamp information.

20 Claims, 4 Drawing Sheets

ROBUST ODOMETRY ARCHITECTURE AND METHODOLOGY

This disclosure is in the field of odometry for vehicles.

A robust system for odometry estimation will be useful in connection with various vehicle functions, including autonomous or semi-autonomous driving and autonomous parking.

SUMMARY

An odometry method is provided, through one or more controllers, for a vehicle that drives on a wheel, the wheel having a wheel rotation sensor that provides pulses with rotation of the wheel, the vehicle having an inertial measurement unit ("IMU"). The method includes estimating odometry of the vehicle to provide odometry data based at least in part on sensor data from the wheel rotation sensor. Additionally, the method includes correcting sensor data from the wheel rotation sensor to provide corrected data by one or more of the following: upon a confirmed stop of the vehicle, using data from a different sensor than the wheel rotation sensor to correct the sensor data; compensating for missing pulses from the wheel rotation sensor by, in a stop-to-move scenario of the vehicle, integrating past IMU data to compensate for the missing pulses; compensating for drift in sensor data from the wheel rotation sensor by, in a move-to-stop scenario of the vehicle, using a past position of the wheel as a current position of the wheel; and compensating for latency among wheel speed calculations made using pulses from the wheel speed sensor, using a transformation matrix.

In the odometry method, the confirmed stop may be confirmed by a gear indicator of the vehicle, such as by the gear indicator indicating that the vehicle is in a Park gear. The different sensor may be the IMU.

A second odometry method is provided, through one or more controllers, for a vehicle. The second odometry method includes estimating odometry of the vehicle based on sensor data from a plurality of sensors to produce a plurality of odometry estimates. The method also includes processing the sensor data to provide processed sensor data by one or more of the following: compensating to prevent calculation imprecision by adjusting a first position origin for the vehicle maintained in the one or more controllers; compensating to prevent calculation imprecision by adjusting a second position origin provided by the one or more controllers to external users of the odometry; and adjusting an operating mode of the odometry method and a relative odometry output from the odometry method based on a predetermined number of past states of the odometry method and a current state. The method also includes using the processed sensor data to provide at least one of vehicle odometry, vehicle states, and time stamp information as outputs from the one or more controllers.

In the second odometry method, floating point numbers may be used in the estimating of the odometry of the vehicle. Further, those floating point numbers may be 32-bit single-precision numbers.

A vehicle includes a plurality of sensors. The vehicle also includes one or more controllers collectively programmed to execute the following instructions: estimate odometry of the vehicle based on sensor data from the plurality of sensors, to produce a plurality of odometry estimates; monitor integrity of one or more of the sensors; correct sensor data from one or more of the plurality of sensors to provide corrected sensor data; arbitrate and compensate the corrected sensor data to provide compensated data; and use the compensated data to provide at least one of vehicle odometry, vehicle states, and time stamp information.

The instruction to monitor integrity of the one or more of the sensors may include an instruction to monitor the one or more of the sensors for sensor fault. The instruction to monitor integrity of the one or more sensors may include an instruction to test for convergence of the plurality of odometry estimates. The instruction to monitor integrity of the one of more of the sensors may include an instruction to test for outliers in the plurality of odometry estimates. The instruction to monitor integrity of the one or more of the sensors may include an instruction to test for rationality of estimates of one or both of longitudinal and lateral velocity of the vehicle. The instruction to monitor integrity of the one or more sensors may include an instruction to test for rationality of estimates of yaw rate of the vehicle.

The vehicle may drive on a wheel. A rotational position sensor may provide rotational position data of the wheel. The instruction to correct data from one or more of the sensors may include, upon a confirmed stop of the vehicle, using data from a different sensor than the wheel rotation sensor to confirm odometry of the vehicle. The different sensor may be an IMU.

Further, a rotational position sensor may sense rotation of the wheel by providing pulses with rotation of the wheel. Additionally, the vehicle may have an IMU. The instruction to correct data from one or more of the sensors may include an instruction compensate for missing pulses from the wheel rotational sensor by, in a stop-to-move scenario of the vehicle, integrating past IMU data to compensate for the missing pulses.

In the vehicle, a rotational position sensor may provide rotational position data of the wheel. The instruction to correct data from one or more sensors may include an instruction to compensate for drift in wheel speed sensor data by, in a move-to-stop scenario of the vehicle, using a past position of the wheel as a current position of the wheel.

Also, in the vehicle, the instruction to correct data from one or more sensors may include an instruction to compensate for latency among wheel speed calculations made using pulses from the wheel speed sensor, using a transformation matrix.

Further, in the vehicle, the instruction to arbitrate and compensate the corrected data may include compensating to prevent floating point calculation inaccuracy by adjusting an internal position origin of the vehicle maintained in the one or more controllers. The instruction to arbitrate and compensate the corrected data may additionally or alternatively include an instruction to adjust an external position origin to compensate for rollover.

The odometry estimates may include relative odometry estimates, and the instruction to arbitrate and compensate the corrected data may include an instruction to adjust an odometry operating mode and a relative odometry output based on a predetermined number of prior states of the odometry and a current state of the odometry.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

DETAILED DESCRIPTION

Figure 1:
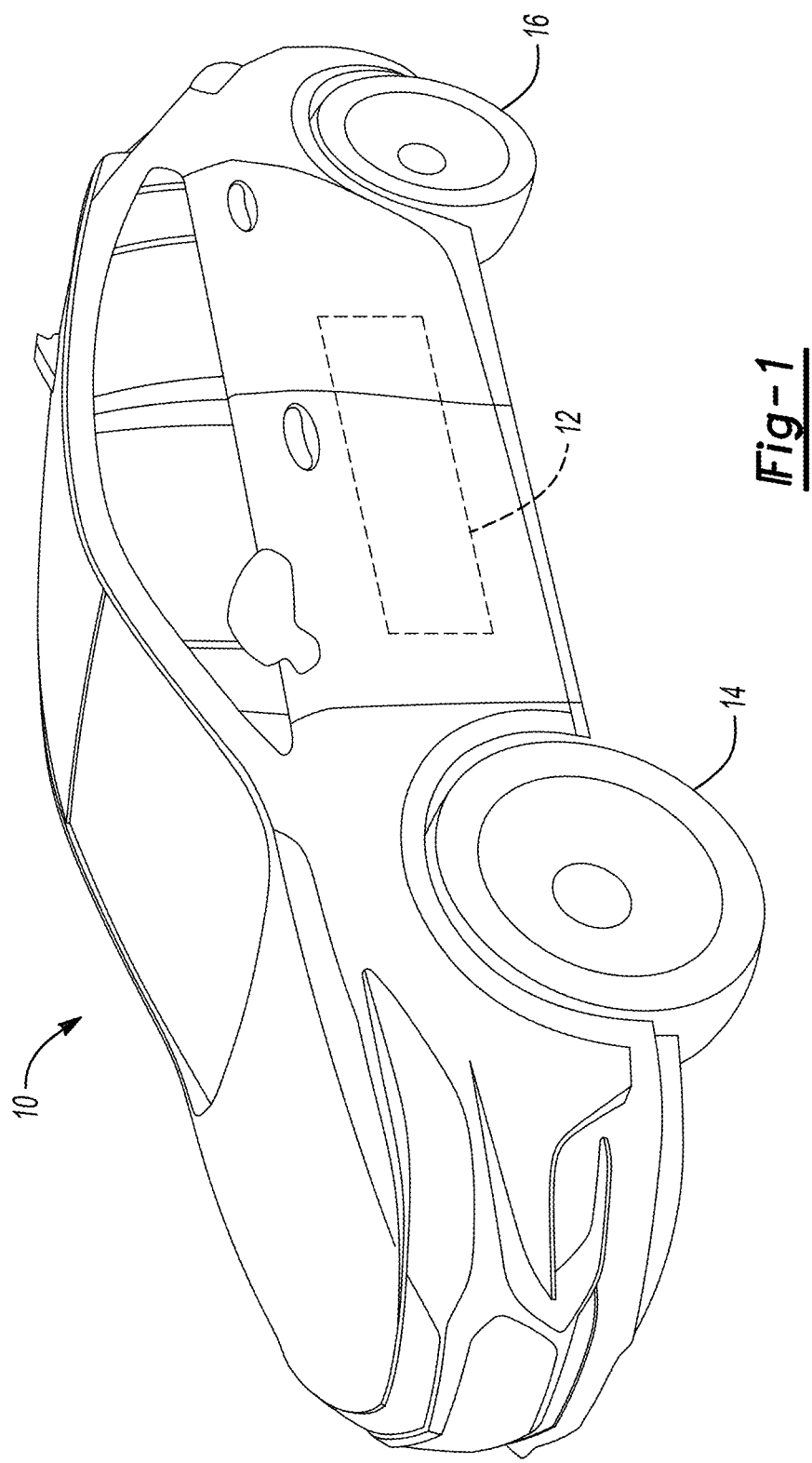
FIG. 1 illustrates a vehicle having an odometry estimation system.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Refer first to FIG. 1. Illustrated there is a vehicle 10. Vehicle 10 may be any style of vehicle, such as a car, truck, van, sport-utility vehicle, motorcycle, scooter, bicycle, or other vehicle. Vehicle 10 may be an electric vehicle, an internal combustion engine vehicle, or a hybrid vehicle having a powertrain containing one or more electric motors and an internal combustion engine. Vehicle 10 may be manually driven, autonomously driven or semi-autonomously driven. Vehicle 10 may have autonomous driving features, such as automated parking. Vehicle 10 may have an odometry estimation system 12 (see also FIG. 2), to measure and/or estimate the distance travelled by vehicle 10, both in absolute terms (that is, distance travelled from an origin location) and in relative terms (that is, incremental distance travelled from one or more previous locations). Vehicle 10 may drive on one or more wheels, such as four wheels, which may include wheel 14 and wheel 16.

For the purposes of this disclosure, "odometry" may be used to refer to estimating or measuring distance travelled by vehicle 10. It may be two-dimensional distance travelled. It may also be distance travelled in both a forward and a reverse direction relative to a front of vehicle 10. It may be distance travelled relative to an absolute origin, whereas the odometry may be referred to as "absolute odometry". Further, "relative odometry" may mean incremental distance travelled with respect to one or more past positions of vehicle 10, rather than with respect to an absolute origin.

Odometry estimation system 12 may include one or more electronic control units (ECUs), such as ECU 100. ECU 100 may be a microprocessor-based controller and should be understood to have the electronic resources (microcontroller, software, memory, inputs, outputs, circuitry, and the like) to perform the functions ascribed to ECU 100 in this disclosure. The functions described in this disclosure may also be distributed among one or more electronic control units in vehicle 10, which may be networked together by data buses and/or hard wiring and may therefore share data and may share computing responsibility.

As ECU 100 and other controllers on vehicle 10 may be microprocessor-based devices, they may operate based on instructions; such instructions may include one or more programmed software commands. Further, some or all such instructions may include additional instructions or software commands.

Inputs to ECU 100 may include inertial measurement unit ("IMU") 102. IMU 102 may measure longitudinal and lateral acceleration, with respect to the x- and y-axes, as well as yaw rate, with respect to the z-axis, of vehicle 10. Inputs to ECU 100 may include one or more wheel rotation (i.e., wheel rotational position) or wheel speed sensors such as wheel encoders 104; one such encoder may be provided for each wheel of vehicle 10. Wheel encoders 104 may generate pulses with rotation of the wheels of vehicle 10, through which the distance travelled by the wheels of vehicle 10, such as wheel 14 and wheel 16, may be measured or calculated. The speeds of the wheels may be calculated by integrating the rate at which pulses are generated by the encoders. "Wheel speed" as referred to in this disclosure may refer to either of rotational speed of a wheel or linear speed of the outer circumference of the tire on the wheel; the speeds are directly related through the radius of the tire and, as such, may be substantially interchangeable for the purposes of this disclosure.

Inputs to ECU 100 may also include one or more steering sensors 106, which may sense the angle to which the steering wheel of the vehicle is turned or the angles(s) to which the wheels of vehicle 10, such as wheel 14 and/or wheel 16, are steered. Another input to ECU 100 may be one or more motor speed sensors 108, which provide the speed of the motor or motors that may drive vehicle 10. Inputs to ECU 100 may also include a gear state sensor 110. Gear state sensor 110 may sense whether vehicle 10 is in Park gear (and, inferentially, not moving) or not in Park gear. Gear state sensor 110 may also sense which non-Park gear that vehicle 10 is in, in order to understand a ratio of speed between the motors that drive vehicle 10 and the speeds of the wheels of vehicle 10.

Inputs to ECU 100 may also include TCP ("transmission control protocol") 112, a global-positioning sensor ("GPS") sensor input that may provide the three-dimensional position of vehicle 10.

The aforementioned inputs to ECU 100 may be used in an odometry estimation system 12, which may estimate or measure the distance travelled by vehicle 10 by a number of algorithms that use the inputs to ECU 100. For instance, wheel encoders 104 may be used to sense the distance travelled by vehicle 10, while steering sensors 106 may be used to sense the contour of the path of vehicle 10. IMU 102 may also be used as an alternative or additional mechanism to determine the distance travelled by vehicle 10 (through, say, twice integrating the longitudinal and/or lateral acceleration of vehicle 10). TCP 112 may provide an alternative or additional means of measuring position of and distance travelled by vehicle 10.

As high-precision odometry may be important, especially in semi-autonomous or autonomous driving or parking features, certain additional processing of calculated odometry data may be desirable. Such additional processing may include functions performed at block 122 (Sensor Correction) and block 124 (Compensation), each of which will be described in more detail hereinafter.

Odometry transformation 126 next occurs. The odometry transformation may include transforming data received at different parts of the vehicle (e.g., at the wheels) to the center of gravity of vehicle 10. This may then result in outputs of ECU 100 that may include vehicle odometry 128, vehicle states 130, and time stamp 132.

Figure 3:
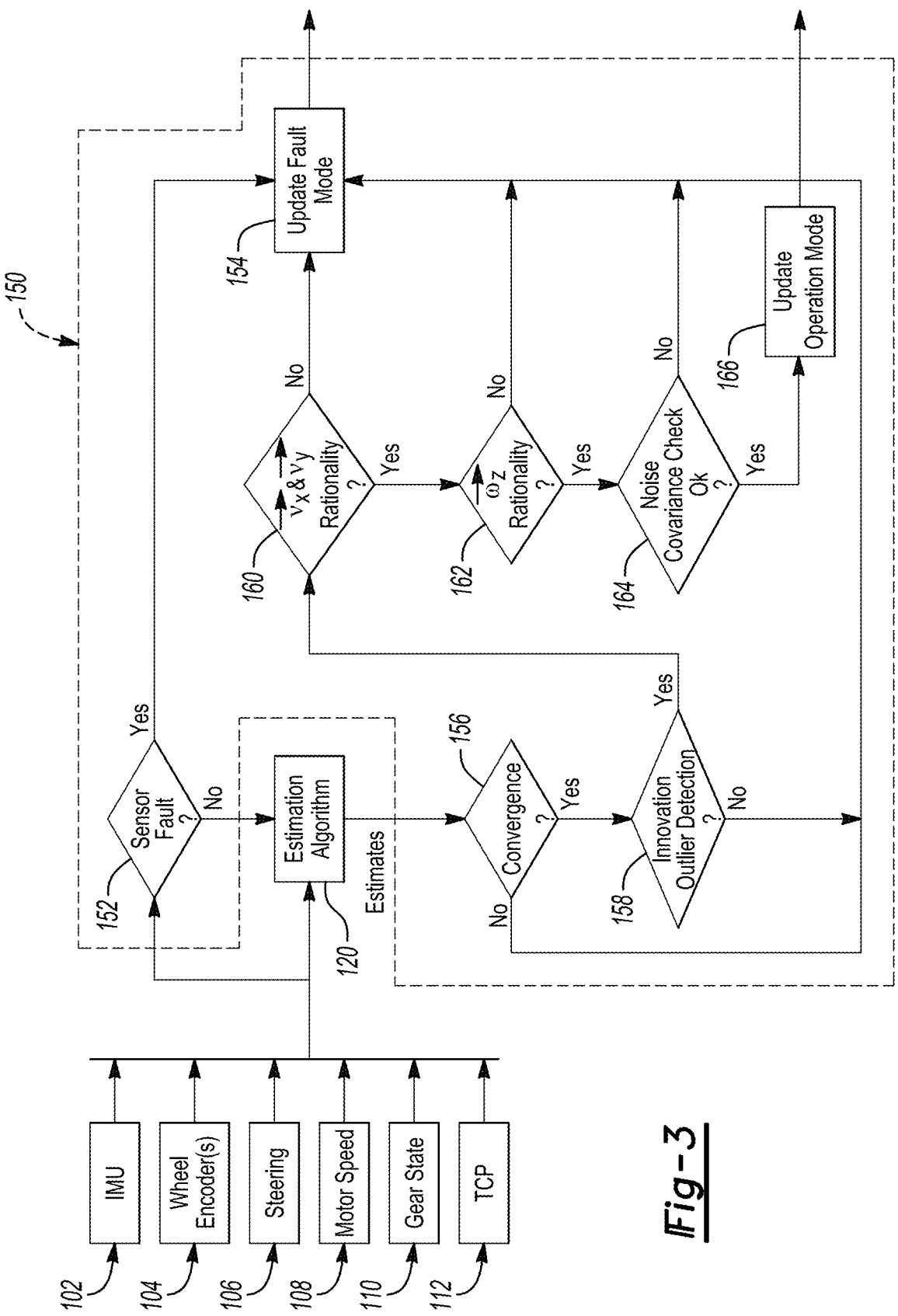
FIG. 3 illustrates a sensor integrity monitor of the odometry estimation system of FIG. 2.

An integrity monitor 150 may test the integrity of the sensors that are inputs to ECU 100. Referring additionally to FIG. 3, integrity monitor 150 may include block 152, a sensor fault testing block. This may include testing to determine basic functionality of the respective sensors, such as whether they are outputting voltages and/or signals at all or voltages and/or signals that are in a reasonable range for the sensors. Fault of a sensor might also manifest itself in the sensor outputting a diagnostic, error, or trouble code that communicates that the sensor has failed.

If one or more of the sensors have been found to have failed, the algorithm proceeds to update the fault by flagging the fault mode at block 154 (Update Fault Mode).

If sensor(s) have not been found to have failed at block 152, then the algorithm proceeds via the aforementioned block 120 to calculate odometry estimates for vehicle 10. Those may then be then subjected to statistical testing at any or all of block 156, block 158, block 160, block 162, and block 164, as a further means of inferring the soundness of the data received from the sensors. At block 156 (Convergence), it is determined whether a sufficient number of consistent, or converged, odometry estimate updates have been received to conclude that the sensor data is likely to be sound. At block 158, (Innovation Outlier Detection), outliers may be identified by, say, Chi-square testing, as a means to help determine whether the sensor data is likely to be sound or whether a subset of inconsistent data are merely outliers.

At block 160 ($\vec{v}_x$ and $\vec{v}_y$ Rationality), several tests may be performed regarding the rationality of the estimated longitudinal and lateral velocity of vehicle 10. For instance, crosschecking may be performed between sensed or counted wheel sensor pulses and calculated wheel speeds for the individual wheels. The consistency between data from wheel to wheel, such as sensed or counted wheel sensor pulses and calculated wheel speeds, may also be checked. Further, the estimated velocity of vehicle 10 may be compared with velocities calculated using data from individual wheel encoders/sensors. Further yet, estimated lateral velocity of vehicle 10 may be compared with lateral velocity calculated by differences in wheel speeds (say, between outer and inner wheels when driving on a curve) and/or vehicle lateral velocity (calculated using lateral acceleration from IMU 102).

At block 162 ($\vec{\omega}_z$ Rationality), a test for rationality of the yaw rate of vehicle 10 may be made. For instance, a comparison may be made between the steering angle of the steering wheel of vehicle 10 or the steering angles of one or more of the wheels of vehicle 10, on the one hand, and the difference in wheel speeds between radially-inward and radially-outward wheels ("radially inward" and "radially outward" relative to a curve on which vehicle 10 may be travelling) may be made. If that comparison is inconsistent, it may be determined that one or more sensors is suspect.

For clarity, when used as geometric variables in this disclosure, "x" refers to a longitudinal (fore-aft) axis, "y" refers to a lateral (side-to-side) axis, and "z" refers to a vertical axis relative to vehicle 10.

At block 164 (Noise Covariance Check OK?), it is determined via a measurement noise covariance check whether sensor measurements are suspect.

If the tests at any of block 156, block 158, block 160, block 162 or block 164 result in NO (that is, the respective statistical test performed at that block is suspect), the algorithm may proceed to block 154 to update the fault mode. If on the other hand, the tests at all of blocks suggest that YES, the sensors appear to be providing reasonable data, the operation mode of the system may be updated at block 166.

Block 122 (Sensor Correction) may next be performed. (If block 122 is performed, one or more of block 122a, block 122b, block 122c and block 122d may be performed). Sensor correction may include block 122a (Speed Based Sensor Source Update). Here, it has been observed that using wheel speed as an input, there may be a latency-induced error pattern in estimated distance travelled by vehicle 10; this may occur above a predetermined speed. The predetermined speed may be a creep speed below which the vehicle and wheel are viewed to be "creeping"; this may be two meters per second. The predetermined speed may also be one-half meter per second, one meter per second, or three meters per second. Below that speed, where wheel pulse counts may be used rather than wheel speed to sense distance travelled by vehicle 10, the latency might not exist. Further, in a move-to-stop event for vehicle 10, latency may also be introduced, because for very precise odometry purposes, the distance travelled between wheel sensor pulses may not be known. Further yet, during a stop-to-move event, similar imprecision may be introduced. And as a result of multiple vehicle maneuvers, such as an automated parking situation, the errors can accumulate. At block 122a, the errors may be corrected by using alternative sensor data to help correct sensor data that may have been subject to accumulated error. For instance, past IMU data that has sensed the motion of vehicle 10 may be used to correct the accumulated odometry error, say, through double integration of the acceleration of vehicle 10; this correction may occur when vehicle 10 is confirmed to be at rest or confirmed to be stopped, such as through gear state sensor 110 reflecting that vehicle 10 is in Park.

Block 122 (Sensor Correction) may also include block 122b (Missing Pulse Compensation), which may be employed in a stop-to-move scenario of vehicle 10. Begin by considering that an observation model for the distance travelled by a wheel of vehicle 10 may be:

$$d_{whl}(t_s, t_c) = \int_{t_s}^{t_c} u_{whl}(t)dt = \frac{2\pi R_{tire}}{N} \Delta n(t_s, t_c),$$

where
$d_{whl}$ is distance travelled by the outer circumference of the tire on the wheel, from time $t_s$ to time $t_c$,
$u_{whl}$ is the linear speed of the outer circumference of the tire,
$R_{tire}$ is the radius of the tire,
N is the number of teeth on the wheel encoder sensor, and
$\Delta n$ ($t_s$, $t_c$) is the number of tooth pulses between time $t_s$ and time $t_c$, $t_s$ is unknown for the first update after vehicle 10 is stopped. There is a delay in the standstill indication, because standstill is inferred after pulses from the respective wheel sensor have stopped; that is, after a pulse has been missing. (There is no wheel sensor pulse data that definitively indicates the moment at which vehicle 10 has stopped.) During this time, incorrect zero velocity observations may be used. Thus, during a stop-to-move detection, this error state may be corrected by integrating past IMU data in order to understand the position of vehicle 10. The integration start time may be taken as the time of the last wheel edge detected by the standstill indication logic. This may result in a look back of, or on the order of, one-half second.

Block 122 (Sensor Correction) may also include block 122c (Drift Compensation) in a move-to-stop scenario for vehicle 10. Consider that when vehicle 10 is stopping, there may be a delay in the indication that vehicle 10 is standing still; there are no additional wheel encoder edge counts to know for certain that vehicle 10 has stopped. An assumption is made at some point that if there are no more wheel encoder edge counts, then vehicle 10 has stopped. Estimation of the stopped state might be made purely through integration of acceleration data from IMU 102, but this may result in quickly-accumulating position errors. In order to compensate for those errors, the following calculations may be used:

$$u_x = x(t_{stop}) - x(t_{current}) \text{ and}$$

$$u_y = y(t_{stop}) - y(t_{current}).$$

$u_x$ and $u_y$ may be taken as corrections to the x and y positions of vehicle 10 that may be employed to compensate for the drift. In the above equations, $t_{stop}$ may be the assumed time that vehicle 10 stopped, and $t_{current}$ may be the current time. The x and y positions at $t_{current}$ may be taken from a buffer of the most recent past positions of vehicle 10. A look-back in the buffer of several hundred milliseconds, say 500 milliseconds, a non-limiting example based on the minimum speed desired to be detected, may be used.

Correcting inaccuracies introduced due to the stop-to-move and move-to-stop scenarios discussed immediately above (latencies involved in classifying and declassifying vehicle 10 as stationary) may be significant in certain scenarios with repeated such events. One such scenario may be automated parking.

Block 122 (Sensor Correction) may also include block 122d (Sensor Latency Compensation) to compensate for wheel speed (integrated from the wheel encoders) being used for wheel distance-of-travel measurement. The issue arises because it is desired to know the state of vehicle 10 now, but measurements of wheel speed may come from several milliseconds ago. In order to compensate, a transformation matrix may be employed that relates the current time to the previous observation time, as follows:

$$\Phi(t_z, t) \approx I - \sum_{i | t_z < t_i \leq t} F(t_i) dt$$

$$\delta z(t_z) = H(t_z) \delta x(t_z) + v$$

$$= H(t_z) \Phi(t_z, t) \delta x(t) + v$$

$$= H(t_z, t) \delta x(t) + v,$$

where
$\Phi(t_z, t)$ is the transformation matrix;
I is the identity matrix;
$F(t_i)$ is a dynamics matrix;
t is the current time;
$t_z$ is a previous observation time;

$\delta z(t_z)$ are error states (the measurement matrix transforms the $\delta x$,
$\delta x(t_z)$ are error states (measured states–estimated states),
H is a measurement matrix that relates that which is observable (z) to that which is desired to be estimated; and
v is measurement noise (an unknown).

After block 122 (Sensor Correction), block 124 (Compensation) may be performed. (If block 124 is performed, then one or more of block 124a, block 124b, block 124c, and 124d may be performed.) Block 124 may include processing that may include block 124a (Floating Point Compensation). Here, continuous operation of vehicle odometry could potentially lead to accuracy degradation because it may rely in certain implementations on a single-precision 32-bit floating-point variable. This loss of accuracy may cause issues both internally in the vehicle odometry estimation process and externally, where vehicle position is provided by odometry estimation system 12 to downstream systems, such as automated or semi-automated driving or parking systems, that use vehicle odometry information.

Estimated position of vehicle 10 may be based on the integration of vehicle velocity, as:

$$p(t) = \int_0^t v(t)dt \approx p(t - \Delta t) + v(t)\Delta t = p(t - \Delta t) + \Delta p(t),$$

where
p is position; and
v is velocity.
Assume non-limiting examples where the smallest velocity of vehicle 10 that is of interest is 1 mm/sec and the computation in ECU 100 runs at a period of 10 msec. Given those examples, the smallest position increment to consider is:

$$\Delta p(t) = v(t)\Delta t$$

$$= 1 \text{ mm/s} \cdot 10 \text{ msec}$$

$$= 0.01 \text{ mm}$$

When the position reaches a value of 100 meters given the parameters in this example, accuracy or precision may be lost. This may be explained by the nature of a 32-bit single-precision floating point number. Such a number has only about seven decimal digits of precision. The greater the integer part of the number is, the less space is left for floating point precision. When the integer part reaches 100 meters, the accuracy of the decimal part dips to 0.008 mm (~0.01 mm).

Therefore, to avoid introducing calculation imprecision in the odometry estimation process, the internal reference origin maintained in ECU 100 for the position of vehicle 10 may be moved (that is, updated) every 100 meters, as follows:

$$p_{internal}(t) = p_{internal}(t - \Delta t) + \Delta p(t)$$

$$|p_{internal}| < 100 \text{ meters}$$

$$p = p_0 + p_{internal},$$

where
$p_{internal}$ is the position used for internal calculations,
p is the final position, and
$p_0$ is the previous position before the reset.

Block 124 (Compensation) may also include block 124b (Rollover Compensation). External "consumers" of odometry information from odometry estimation system 12, such as autonomous or semi-autonomous parking or driving systems, may not (purely as an example) be interested in position precision of greater than, say 1 mm (whereas, internally, precision may be tracked to 0.01 mm, as discussed above in connection with block 124a). Because in this example the smallest increment in which external consumers may be interested may be 1 mm, the floating point accuracy issue may arise for those users every 10 km. As such, the origin of reference provided to those users may be reset (again, purely by way of example) every 10 km. This sudden change may cause issues for those users, including those that calculate relative odometry (that is, a delta between one position and one or more previous positions) unless a compensation mechanism is provided. That compensation mechanism may be via block 124b (rollover compensation). There, an odometry buffer may be maintained, as follows:

| Relative Time | Odometry Buffer | | | | |
|---|---|---|---|---|---|
| 0 | O | O | O | O | O |
| 1 | O | O | O | O | N |
| 2 | O | O | O | N | N |
| 3 | O | O | N | N | N |
| 4 | O | N | N | N | N |
| 5 | N | N | N | N | N |

Until the buffer is fully populated with position information for vehicle 10 in terms of the new frame of reference relative to the new origin (N), ECU 100 will provide the data to external consumers with corrections between the old origin (O) and new origin to avoid the odometry data being used by those external consumers from drastically jumping because of the change of reference. Once the buffer is full of all data from the new frame of reference relative to the new origin (e.g., at an example Relative Time=5 in the above table), such corrections may be discontinued.

Relative vehicle odometry relies on a previous number of samples for correct calculation of vehicle distance travelled. For the most useful relative odometry, all samples might originate from a single source of algorithms. In order to facilitate smooth transitions between states, the following state transitions may be used at block 124c (State Transition):

| States | | Output | |
|---|---|---|---|
| Previous N State(s) | Current State | Operating Mode | Relative Odometry Output |
| Normal Operation | Normal Operation | Normal Operation | Estimate |
| Normal Operation | Sensor Fault | Sensor Fault | Default Value |
| Normal Operation | Non-Sensor Fault | Remedial Operation | Remedial Estimate |
| Sensor Fault | Normal Operation | Not Converged | Default Value |
| Sensor Fault | Sensor Fault | Sensor Fault | Default Value |
| Sensor Fault | Non-Sensor Fault | Not Converged | Default Value |
| Non-Sensor Fault | Normal Operation | Remedial Operation | Remedial Estimate |
| Non-Sensor Fault | Sensor Fault | Sensor Fault | Default Value |
| Non-Sensor Fault | Non-Sensor Fault | Remedial Operation | Remedial Estimate |

Figure 2:
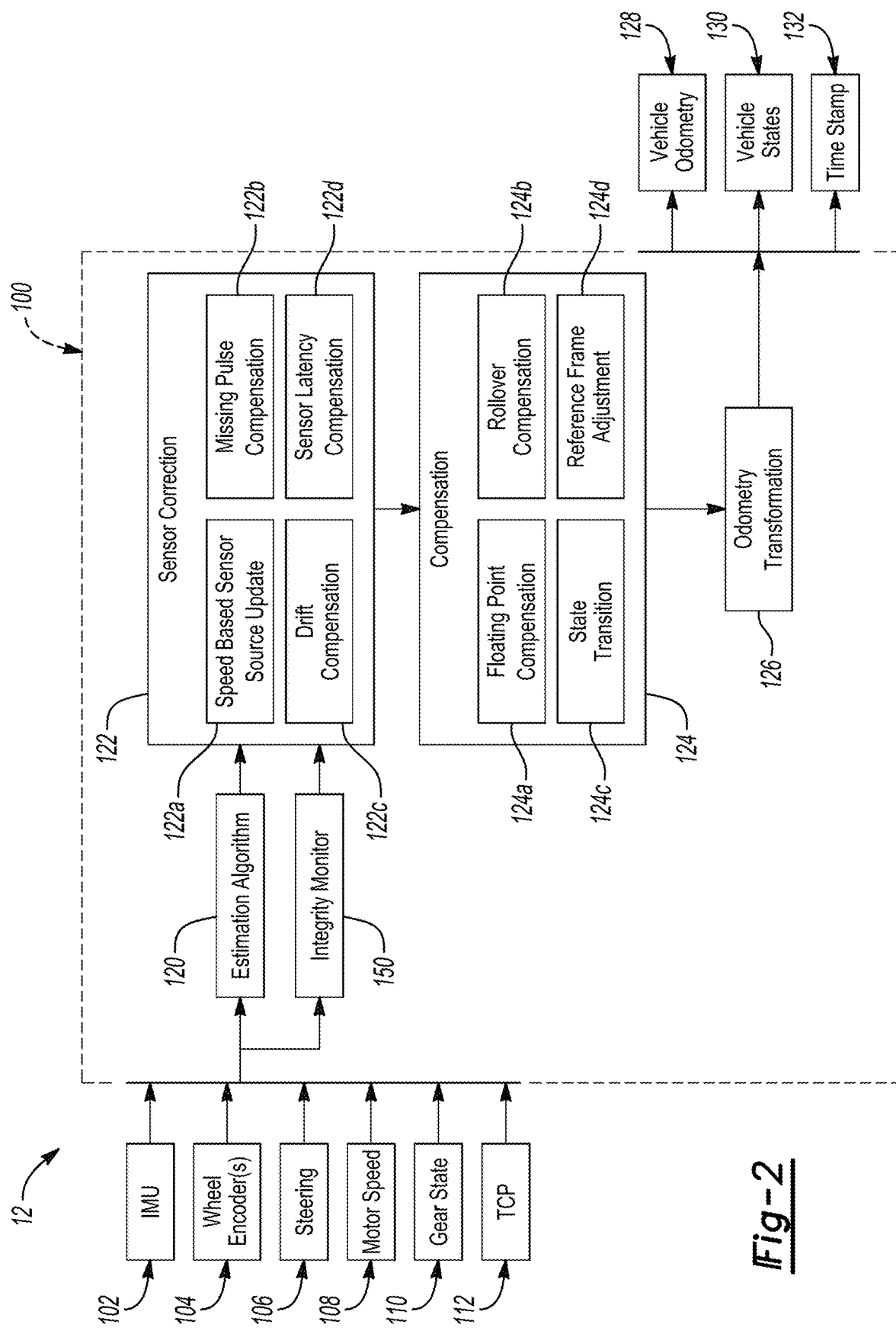
FIG. 2 illustrates the odometry estimation system of FIG. 1.

In the above table,

Normal Operation means normal operation of the system;

Sensor Fault refers to a sensed fault of a relevant sensor (see block 152, FIG. 2);

Non-Sensor Fault means that a statistical anomaly has been detected (see block 156, block 158, block 160, block 162, and block 164, FIG. 2);

Estimate means that an estimate of relative odometry is used, according to Normal Operation of the system, which may include block 122 and/or block 124 (FIG. 2);

Default Value means a default value that may be selected by the system designer;

Not Converged means that states for the initial and current odometry reading were not consistent, so relative odometry might not reliably be calculated; and Remedial Estimate means that a simple sensor integration may be used for odometry estimation, without compensation per block 122 and block 124.

The relative odometry output provided to downstream users may follow the "Relative Odometry Output" column for each of the conditions in the above table.

Figure 4:
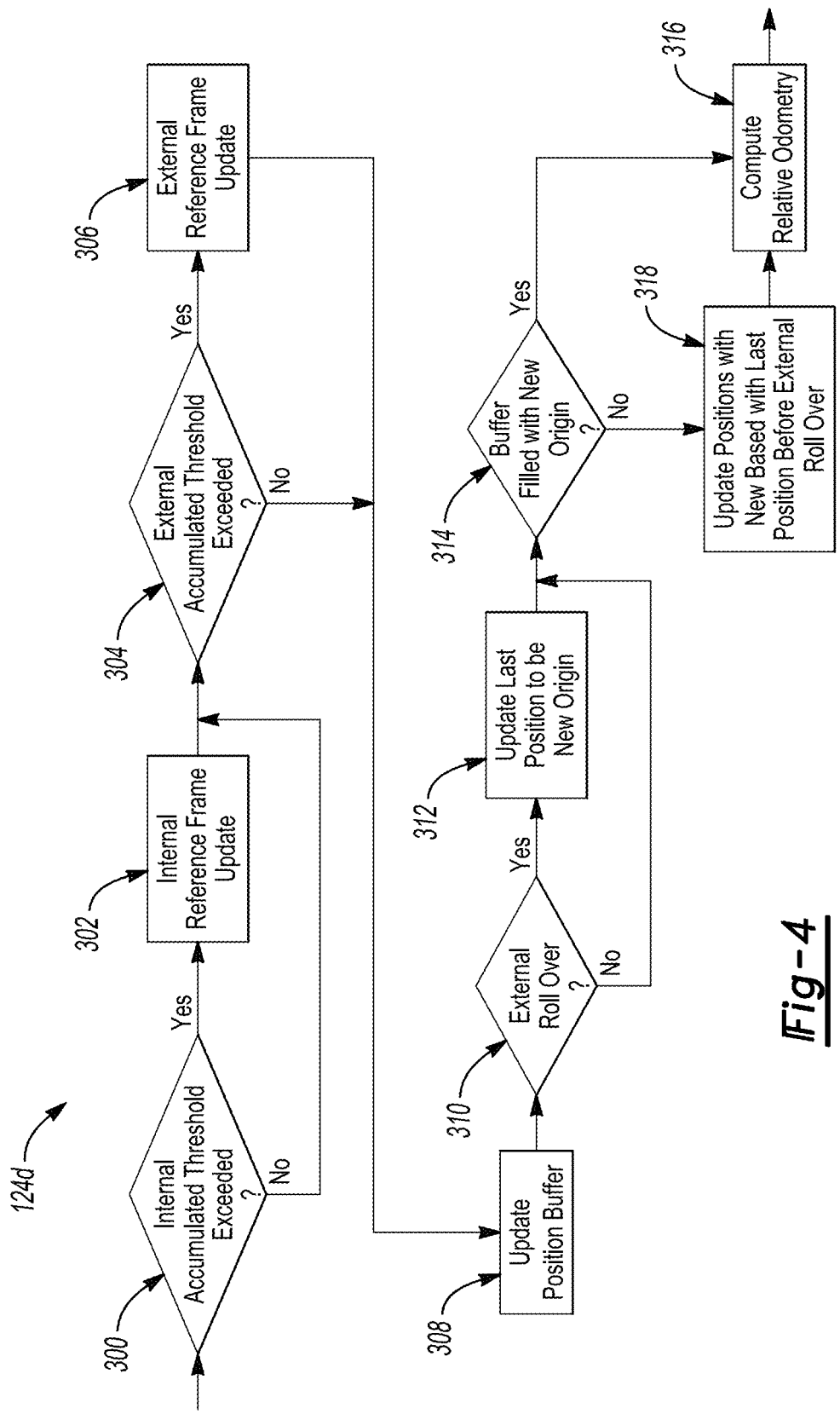
FIG. 4 illustrates a reference frame adjustment routine for the odometry estimation system of FIG. 2.

Block 124 (Compensation) may also include block 124d (Reference Frame Adjustment); see also FIG. 4. There, it is determined at block 300 whether the internal accumulated threshold has been exceeded. If YES, then the internal reference frame is updated at block 302 (see also block 124a (FIG. 2)). At block 304, it is then determined whether the external accumulated threshold has been exceeded. If YES, then at block 306, the external reference frame is updated and at block 308, the position buffer is updated (see also block 124b (FIG. 2)). It is then determined at block 310 whether an external rollover has occurred. If YES, then at block 312, the last position of vehicle 10 is updated to be the new origin for the position of vehicle 10. If NO, then the routine proceeds to block 314.

It is then determined at block 314 whether the buffer is filled with the new origin. If YES, then relative odometry may be calculated at block 316, given that the buffer is filled with data referencing a common origin. If NO, then at block 318, the positions are updated with the new origin based on the last position before the external rollover. Relative odometry may then be calculated at block 318 and provided to systems that consume/use that relative odometry.

Referring again to FIG. 2, after block 122 (Sensor Correction) and block 124 (Compensation), then block 126 (Odometry Transformation) may be performed. The output, for downstream users of the odometry information processed by odometry estimation system 12, may be vehicle odometry 128, vehicle states 130, and time stamp 132. Vehicle states 130 may include yaw rate, vehicle velocity, and vehicle accelerations (lateral and longitudinal) of vehicle 10.

Embodiments according to the present disclosure may have many advantages. The architecture disclosed may seamlessly shift between various sources of measurements to provide continuous and stable odometry information. The architecture may provide accumulated odometry information over a long period of time. The methodology disclosed is robust to single-precision, floating-point limitation that can cause accumulated error over long operation, which after a long drive may cause accuracy issues in fine, low-speed maneuvers. The architecture and methodology disclosed herein may provide robust odometry even in view of sensor faults and potential statistical errors. The architecture and methodology may also adjust odometry information upon frame-of-reference resets. The architecture and methodology may also provide vehicle states and odometry along with time stamps to remove potential latency between states and odometry when used by downstream users.

As embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure.

Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims. Moreover, this disclosure expressly includes combinations and sub-combinations of the elements and features presented above and below.

What is claimed is:

1. A vehicle comprising an odometry system, the odometry system including:
    a plurality of sensors; and
    one or more controllers collectively programmed to execute the following instructions:
    estimate odometry of the vehicle based on sensor data from the plurality of sensors, to produce a plurality of odometry estimates;
    monitor integrity of one or more of the plurality of sensors;
    correct sensor data from one or more of the plurality of sensors to provide corrected sensor data;
    compensate the corrected sensor data to provide compensated data; and
    use the compensated data to provide at least one of vehicle odometry, vehicle states, and time stamp information;
    wherein the instruction to compensate the corrected sensor data further includes an instruction to adjust an external position origin of the vehicle provided by the one or more controllers to external users of the vehicle odometry.

2. The vehicle of claim 1, wherein the instruction to monitor integrity of one or more of the plurality of sensors includes an instruction to monitor the one or more of the sensors for sensor fault.

3. The vehicle of claim 1, wherein the instruction to monitor integrity of one or more of the plurality of sensors includes an instruction to test for convergence of the plurality of odometry estimates.

4. The vehicle of claim 1, wherein the instruction to monitor integrity of one of more of the plurality of sensors includes an instruction to test for outliers in the plurality of odometry estimates.

5. A vehicle comprising an odometry system, the odometry system including:
    a plurality of sensors; and
    one or more controllers collectively programmed to execute the following instructions:
    estimate odometry of the vehicle based on sensor data from the plurality of sensors, to produce a plurality of odometry estimates;
    monitor integrity of one or more of the plurality of sensors;
    correct sensor data from one or more of the plurality of sensors to provide corrected sensor data;
    compensate the corrected sensor data to provide compensated data; and
    use the compensated data to provide at least one of vehicle odometry, vehicle states, and time stamp information;
    wherein the instruction to monitor integrity of one or more of the plurality of sensors includes an instruction to test for rationality of estimates of one or both of longitudinal and lateral velocity of the vehicle.

6. The vehicle of claim 1, wherein the instruction to monitor integrity of one or more of the plurality of sensors includes an instruction to test for rationality of estimates of yaw rate of the vehicle.

7. The vehicle of claim 1, wherein:
    the vehicle drives on a wheel;
    a rotational position sensor provides rotational position data of the wheel; and
    the instruction to correct sensor data from one or more of the plurality of sensors includes, upon a confirmed stop of the vehicle, using data from a different sensor than the rotational position sensor to confirm odometry of the vehicle.

8. A vehicle comprising an odometry system, the odometry system including:
    a plurality of sensors; and
    one or more controllers collectively programmed to execute the following instructions:
    estimate odometry of the vehicle based on sensor data from the plurality of sensors, to produce a plurality of odometry estimates;
    monitor integrity of one or more of the plurality of sensors;
    correct sensor data from one or more of the plurality of sensors to provide corrected sensor data;
    compensate the corrected sensor data to provide compensated data; and
    use the compensated data to provide at least one of vehicle odometry, vehicle states, and time stamp information;
    wherein:
    the vehicle drives on a wheel;
    a rotational position sensor senses rotation of the wheel by providing pulses with rotation of the wheel;
    the vehicle has an inertial measurement unit ("IMU"); and
    the instruction to correct sensor data from one or more of the plurality of sensors includes an instruction to compensate for missing pulses from the rotational position sensor by, in a stop-to-move scenario of the vehicle, integrating past IMU data to compensate for the missing pulses.

9. The vehicle of claim 1, wherein:
the vehicle drives on a wheel;
a rotational position sensor provides rotational position data of the wheel; and
the instruction to correct sensor data from one or more of the plurality of sensors includes an instruction to compensate for drift in the rotational position data by, in a move-to-stop scenario of the vehicle, using a past position of the wheel as a current position of the wheel.

10. The vehicle of claim 1, wherein:
the vehicle drives on a wheel;
a rotational position sensor provides rotational position data of the wheel; and
the instruction to correct sensor data from one or more of the plurality of sensors includes an instruction to compensate for latency among wheel speed calculations made using the rotational position data, using a transformation matrix.

11. The vehicle of claim 1, wherein the instruction to compensate the corrected sensor data includes compensating to prevent floating point calculation inaccuracy by adjusting an internal position origin of the vehicle maintained in the one or more controllers.

12. The vehicle of claim 1, wherein:
the odometry estimates include relative odometry estimates; and
the instruction to compensate the corrected sensor data includes an instruction to adjust an odometry operating mode and a relative odometry output based on a predetermined number of prior states of the odometry system and a current state of the odometry system.

13. The vehicle of claim 7, wherein:
the confirmed stop is confirmed by a gear indicator of the vehicle indicating that the vehicle is in a Park gear; and
the different sensor is an IMU.

14. The vehicle of claim 5, wherein:
the vehicle drives on a wheel;
a rotational position sensor provides rotational position data of the wheel; and
the instruction to correct sensor data from one or more of the plurality of sensors includes an instruction to compensate for drift in the rotational position data by, in a move-to-stop scenario of the vehicle, using a past position of the wheel as a current position of the wheel.

15. The vehicle of claim 5, wherein:
the vehicle drives on a wheel;
a rotational position sensor provides rotational position data of the wheel; and
the instruction to correct sensor data from one or more of the plurality of sensors includes an instruction to compensate for latency among wheel speed calculations made using the rotational position data, using a transformation matrix.

16. The vehicle of claim 5, wherein:
the odometry estimates include relative odometry estimates; and
the instruction to compensate the corrected sensor data includes an instruction to adjust an odometry operating mode and a relative odometry output based on a predetermined number of prior states of the odometry system and a current state of the odometry system.

17. The vehicle of claim 8, wherein the instruction to monitor integrity of one or more of the plurality of sensors includes an instruction to monitor the one or more of the sensors for sensor fault.

18. The vehicle of claim 8, wherein the instruction to monitor integrity of one or more of the plurality of sensors includes an instruction to test for convergence of the plurality of odometry estimates.

19. The vehicle of claim 8, wherein the instruction to monitor integrity of one of more of the plurality of sensors includes an instruction to test for outliers in the plurality of odometry estimates.

20. The vehicle of claim 8, wherein the instruction to monitor integrity of one or more of the plurality of sensors includes an instruction to test for rationality of estimates of yaw rate of the vehicle.

* * * * *